United States Patent [19]
Reick et al.

[11] 4,454,982
[45] Jun. 19, 1984

[54] CONTROL VALVE

[75] Inventors: Georg Reick, Bolingbrook, Ill.; Wilhelm Zirps, Hemmingen, Fed. Rep. of Germany

[73] Assignee: Robert Bosch GmbH, Stuttgart, Fed. Rep. of Germany

[21] Appl. No.: 538,673

[22] Filed: Oct. 3, 1983

Related U.S. Application Data

[63] Continuation of Ser. No. 353,586, Mar. 1, 1982, abandoned.

[30] Foreign Application Priority Data

Mar. 19, 1981 [DE] Fed. Rep. of Germany ....... 3109850

[51] Int. Cl.³ ............................................. G05D 27/00
[52] U.S. Cl. .................................. 236/92 R; 137/491; 236/93 R
[58] Field of Search .................. 236/93 A, 99 J, 99 R, 236/100, 92 R; 137/491, 625.3, 513.5; 138/40

[56] References Cited

U.S. PATENT DOCUMENTS

| | | | |
|---|---|---|---|
| 3,285,261 | 11/1966 | Chaney | 137/491 X |
| 3,768,731 | 10/1973 | Lavado | 236/93 R |
| 4,180,208 | 12/1979 | Obermaier | 236/93 A X |
| 4,244,518 | 1/1981 | Foller | 236/58 |
| 4,303,197 | 12/1981 | Sandau | 236/92 R |
| 4,336,903 | 6/1982 | Zirps | 236/99 J X |

Primary Examiner—William E. Tapolcai
Attorney, Agent, or Firm—Michael J. Striker

[57] ABSTRACT

A control valve for maintaining the temperature respectively the viscosity of pressure fluid passing therethrough substantially constant comprises a control slide provided with a throttle bore and downstream of the control slide a precontrol valve in which an end portion of an element expandable by the temperature of the pressure fluid is arranged. When pressure fluid with a certain pressure is fed through the inlet end of the control valve, the control slide is lifted from its seat and the precontrol valve opens. All of the pressure fluid entering the control valve is passed through various bores and annular gaps along the precontrol valve to the temperature expandable element. When the fluid reaches the desired maximum temperature a bypass for the fluid is created by the expandable element and a control pin actuated by the latter. Thereby the throttle action of the control valve is reduced and overheating of the pressure fluid avoided. A throttle gap between the control slide and the housing will assure removal of any air contained in the pressure fluid and a further throttle gap formed between an end face of the control slide and a disc attached thereto serves to catch any foreign particles in the pressure fluid which will be flushed away after moving of the control slide away from its seat.

8 Claims, 1 Drawing Figure

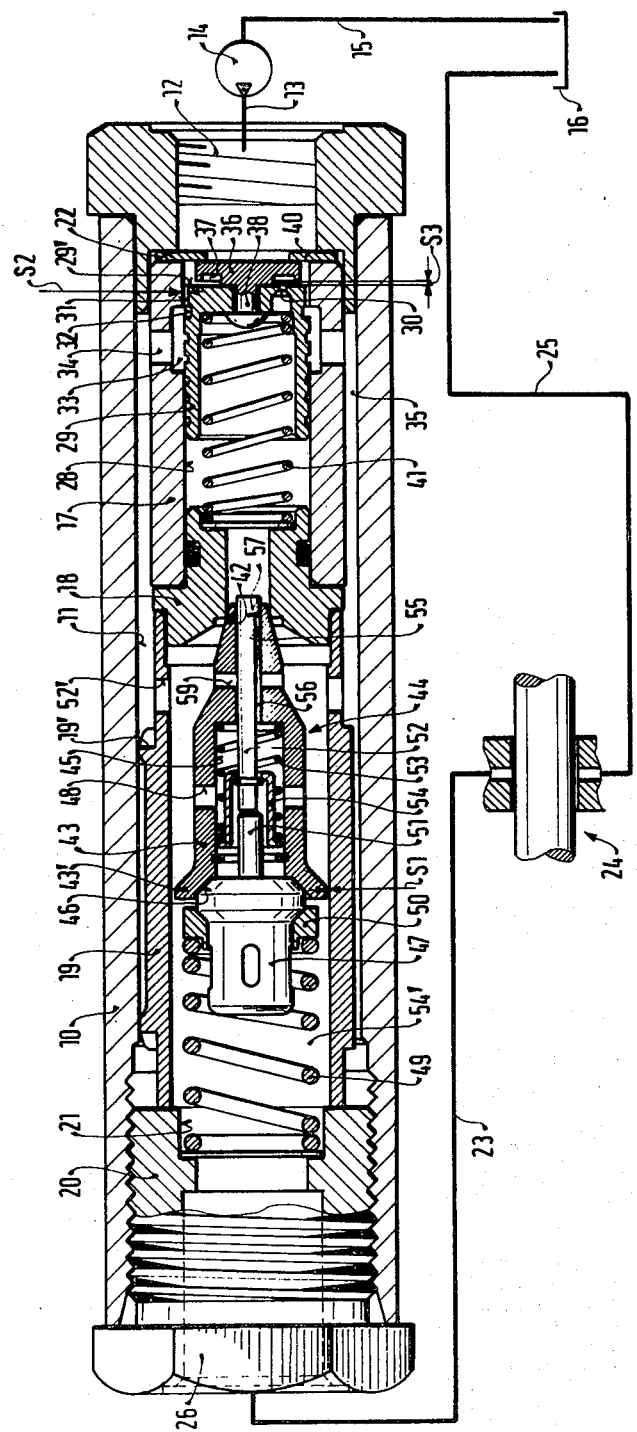

CONTROL VALVE

This is a continuation of application Ser. No. 353,586, filed Mar. 1, 1982, now abandoned.

BACKGROUND OF THE INVENTION

The present invention relates to a control valve for maintaining the viscosity respectively the temperature of pressure fluid in a hydraulic arrangement substantially constant by throttling the flow of pressure fluid at a control slide and with an element influenced by the temperature of the pressure fluid, whereby downstream of the control slide a precontrol valve is arranged which receives the aforementioned element and which controls an additional throttling connection from the inlet to the outlet of the valve. In a known control valve of the aforementioned kind it happens sometimes that air passes from the source of pressure fluid into the valve, whereby the action of the temperature influenced element will be disturbed, which may lead to operating trouble due to overheating of the pressure fluid. It may also happen that when the pressure fluid, especially oil, is contaminated, foreign particles pass in a throttle bore in the control slide, which will disturb the proper function of the valve.

SUMMARY OF THE INVENTION

It is an object of the present invention to provide a control valve for maintaining the viscosity respectively the temperature of a pressure fluid passing therethrough substantially constant and which avoids the disadvantages of such a valve known in the art.

It is an additional object of the present invention to provide a control valve of the above-mentioned kind which will operate trouble-free under all operating conditions and which will prevent any overheating of the pressure fluid passing through the valve.

With these and other objects in view, which will become apparent as the description proceeds, the control valve according to the present invention for maintaining the viscosity and temperature of a pressure fluid passing therethrough substantially constant mainly comprises elongated tubular housing means having a pressure fluid inlet at one end and a pressure fluid outlet at the other end, a control slide in the housing means adjacent the pressure fluid inlet and guided in the housing means for movement in axial direction, a member forming a valve seat arranged in the housing means coaxially with and downstream of the control slide, first spring means between this member and the control slide for biasing the latter against a shoulder of the housing means formed at the pressure fluid inlet, precontrol valve means downstream of the valve seat forming member and comprising a closer member having at one end a portion adapted to engage the valve seat, control means including an element of expandable material influenced by the temperature of the pressure fluid partly received in the other end of the closer member and controlling a throttle connection between the pressure fluid inlet and the pressure fluid outlet, second spring means between the outlet and the element for pressing the latter against the other end of the closer member and therewith the portion at said one end of the closer member against the valve seat, passage means leading from the inlet to the aforementioned element, and a throttling passage provided in the control slide forming part of the passage means.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE illustrates a longitudinal cross-section of the control valve according to the present invention.

DESCRIPTION OF A PREFERRED EMBODIMENT

Referring now to the drawing, it will be seen that the housing means of the control valve according to the present invention comprise an outer member 10 formed with an axial bore 11 extending therethrough into one end of which a member is inserted forming the inlet 12 of the control valve. A conduit 13 leads from the inlet 12 to a pump 14 which feeds pressure fluid over a suction conduit 15 from a container 16 to the inlet. A control bushing 17, a member 18 forming a valve seat and a distance sleeve are arranged one after the other in the bore 11 of which the control bushing 17 and the distance sleeve 19 form part of the housing means and in which the one after the other arranged parts are pressed by a hollow screw 20 provided with a bore 21 therethrough against a shoulder 22 formed at the member constituting the inlet 12. The outer end of the bore 22 forms the outlet 26 of the valve from which a conduit 23 leads to a consumer 24, for instance a lubricator for a shaft, from which a return conduit 25 leads to the container 16. It is essential that the pressure fluid fed to the consumer 24 has a constant temperature and/or viscosity. A control slide 29 is closely guided in the bore 28 of the control bushing 17. The control slide 29 is cup-shaped and has a flat bottom 29' through which a throttle bore 30 extends which is arranged eccentric to the longitudinal axis of the control slide 29. A plurality of throttle grooves 31 are provided at the outer periphery of the control slide 29 extending from the outer end face of the bottom 29' thereof and leading to an annular groove 32 likewise formed at the outer periphery of the control slide 29, which groove 32 is in the position of the control slide 29 as shown in the drawing in communication with an annular groove 33 formed at the inner surface of the control bushing 17. A plurality of radial bores 34 lead from the annular groove 33 outwardly to an annular space 35 formed between the outer surface of the control bushing 17 and the inner surface of the outer tubular member 10.

The central region of a disc 36 is connected by a rivet 38 to the bottom 29' of the control slide 29. The outer diameter of the disc 37 is about 20% smaller than the outer diameter of the control slide 29. Between the outer end face of the bottom 29' of the control slide and the end face of the disc 36 directed towards the outer end face of the bottom of the control slide there is formed a small annular gap S3. A flat annular groove 37 is provided at the end face of the disc 36 which is directed towards the bottom 29' of the control slide and the throttle bore 30 through the bottom 29' of the control slide communicates with the region of the flat annular groove 37. An annular washer 40 abuts against the shoulder 22 and the disc 36 is pressed by spring 41 biasing the control slide 29 toward the annular disc 40 against the latter. The end of the spring facing away from the control slide 29 abuts onto the member 18 forming a valve seat 42 for a closer member 43 of a precontrol valve 44 arranged downstream of the control slide 29 in the spacer sleeve 19. The closer member 43 is provided with a blind bore 45 from which a plurality of crossbores 48 lead outwardly to the annular space between the outer surface of the closer member and the inner surface of the spacer sleeve 19. An element 47 expandable by the temperature of the pressure fluid passing through the control valve abuts against the shoulder 47 at the open end of the blind bore 45 of the closer member 43. The element 47 is pressed against the shoulder 46 by a coil compression spring 49 the outer end portion of which is arranged in the bore 21 of the hollow screw 20. The spring 49 acts over a spring washer 50 onto the element 47 and presses at the same time the closer member 43 against its valve seat 42.

The element 47 has a coaxial piston 51 extending into the interior of the closer member 43 and a control pin 52 abuts with one end against the free end of the piston under the influence of a spring 53 which over a spring cup 54 acts on the control pin 52. The control pin 52 is guided in a bore 55 which leads from the inner end of the blind bore 45 up to the end of the closer member 43 which engages the valve seat 42. The control pin 52 is flattened at one side thereof so that a gap 56 results between the control pin 52 and the bore 55. The flat provided at one side of the control pin 52 does however not extend through the whole length thereof, but the pin has at its end facing away from the piston 51 an enlarged portion 57 which completely fills the cross-section of the bore 55. A plurality of crossbores 59 extending from the bore 55 to the outer surface of the closer member 43 are provided in the latter. The closer member has further in the region in which the element 47 is received an outwardly extending ring 43' of a slightly smaller outer diameter than the inner diameter of the spacer sleeve 19 to form with the latter an annular gap S1 of small cross-section.

A plurality of radial bores 52' extend through the spacer sleeve 19 which shortly downwardly of the body 18 open into the space in which the precontrol valve 44 is arranged. A dam-up edge 19' is provided at the outer periphery of the spacer sleeve 19 downstream of the crossbores 52' and engaging the inner surface of the outer tubular member 10 of the housing. The space in which the element 47 is arranged is designated with the reference numeral 54'.

The above-described control valve according to the present invention will operate in the following manner:

The pressure fluid pumped by the pump 14 and fed through the inlet 12 into the valve housing and passes through the central opening in the annular washer 40, against which the disc 36 abuts in a non-sealing manner, over the throttle gap S3 to the throttle bore 30 and from there into the interior of the control slide 29. The pressure fluid passes also in the starting position of the control slide 29 as shown in the drawing through the groove 31 into the annular groove 33. At a slow number of revolutions of the pump 14, for instance during starting of the motor driving the pump, the pressure fluid flows over the grooves 31, so that for instance air contained in the pressure fluid may flow out from the same. The grooves 31 will also assure that during a predetermined starting region of the pump a pressure in the fluid increasing from zero will be obtained. Pressure fluid passing through the throttle bore 30 into the interior of the control slide 29 will impinge upon the closer member 43 of the precontrol valve 44. At the start of the operation the pressure fluid will be cold, so that the piston of the element 47 will be retracted and the enlarged end portion 57 of the control pin 52 will close the bore 55 at its outer end. At increasing pressure of the pressure fluid the closer member 43 will be lifted from its seat 42 in opposition against the force of the spring 49, so that now pressure fluid will flow over the throttle bore 30, the precontrol valve 44 and the annular gap S1 to the outlet 26 and from there to the consumer 24.

Due to the pressure gradient created at the throttle 30, the control slide 29 is moved against the force of the spring 41 toward the precontrol valve 44, whereby a direct connection from the inlet 12 to the annular groove 33 is obtained and over the crossbore 34 to the annular space 35 and from the latter over the crossbores 52' to the space in which the precontrol valve 44 is arranged. The total pressure fluid stream flows now over the annular gap S1 into the space 54' in which the spring 49 is arranged. The pressure built up upstream of the annular gap S1 with icncreasing flow-through of the pressure fluid impinges on the outwardly extending rim 43' of the closure member to move the latter in the direction of the pressure fluid passing through the valve. The thereby resulting axial force acts in opposition to the spring 49 so that the force acting on the precontrol valve 44 and therewith the there built-up pressure is reduced at increasing pressure fluid stream.

The pressure fluid in the space 54' flows over the element 47. When the desired maximum operating temperature of the pressure fluid is reached, the piston 51 will extend and move the control pin 52 thereby in axial direction. After the control pin 52 has moved to a certain extent the enlarged portion 57 at the end of the control pin 52 will be moved out of the bore 55 so that a bypass is created, that is the pressure fluid can flow also over the gap 56 into the interior of the closer member 43 to flow from there over the crossbores 48 and over the annular gap S1 likewise to the space 54'.

The heating up of the pressure fluid occurs through the throttling between the control slide 29 and the annular groove 33 and at the valve seat 42 for the closer member 43 when the precontrol valve 44 is opened. Due to the bypass at the precontrol valve 44 the pressure in the space in which the spring 41 is arranged is reduced so that the control slide 29 can move against the force of the spring 41 further toward the member 18, whereby the throttle action and therewith a further heating up of the pressure fluid will be reduced. When the temperature of the pressure fluid is reduced, the control pin 42 will again be moved inwardly so that the enlarged end portion thereof closes the bypass. In this way a state of equilibrium is obtained, which leads to a constant temperature of the pressure fluid. The pressure drop between the inlet 12 and the outlet 26 is controlled by the bypass which is closed or opened by the enlarged portion 57 on the control pin 52 in dependence on the temperature of the pressure fluid.

A continuous control pressure fluid stream passes over the throttle bore 30 to the precontrol valve 44. This control pressure fluid stream passes from the inlet 12 over the gap S3 to the throttle bore 30. The gap 53 will insure, that when the control slide 29 is open, the essentially greater pressure fluid stream passing by the outer end of the gap will carry along dirt particles which collect at the region of the outer end of the gap to thereby prevent clogging of the throttle bore 30.

It will be understood that each of the elements described above, or two or more together, may also find a useful application in other types of control valves differing from the types described above.

While the invention has been illustrated and described as embodied in a control valve for maintaining the viscosity and temperature of pressure fluid passing therethrough substantially constant, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the present invention.

What is claimed as new and desired to be protected by Letters Patent is set forth in the appended claims:

1. A control valve for maintaining the viscosity and temperature of a pressure fluid for a hydraulic arrangement substantially constant, comprising elongated tubular housing means having a longitudinal axis, a pressure fluid inlet at one end and a pressure fluid outlet at the other end; a control slide in said housing means adjacent the pressure fluid inlet and closely guided in said housing means for movement in axial direction of the latter, said control slide defining an interior and having a peripheral surface; a member forming a valve seat arranged in said housing means coaxially with and downstream of said control slide; first spring means between said member and said control slide for biasing the latter against a shoulder of said housing means formed at the pressure fluid inlet; precontrol valve means downstream of said valve seat forming member, said precontrol valve means comprising a closer member having at one end a portion adapted to engage said valve seat; control means including an element of expandable material influenced by the temperature of the pressure fluid, said element being partly received in the other end of said closer member for controlling a throttle connection between said pressure fluid inlet and said pressure fluid outlet; second spring means between said outlet and said element for pressing the latter against said other end of said closer member and therewith said portion at said one end of said closer member against said valve; seat; passage means leading from said inlet to said element; a first throttle passage provided at said peripheral surface of said control slide and forming part of said passage means, for providing a direct connection between said pressure fluid inlet and pressure fluid outlet when said control slide is in its foremost position constituting its initial position with respect to the inlet thereby preventing air from penetrating into the interior of the control slide; a second throttle passage providing a connection between the inlet and the precontrol valve and means for cooperating with the control slide to form with the latter an annular gap communicating with said second throttle passage and forming with the latter another part of the said passage means thereby preventing any contamination present in the pressure fluid from clogging said second throttle passage.

2. A control valve as defined in claim 1, wherein said housing means includes a control portion, said control slide being cup-shaped and having a bottom wall facing said pressure fluid inlet and including a periphery, and wherein said throttle passage is constituted by at least one groove extending in axial direction along the periphery of said bottom wall and being in continuous communication with an annular groove in said control portion of said housing means in which said control slide is guided.

3. A control valve as defined in claim 1, wherein said closer member has at the other end thereof and outwardly extending ring forming with the inner surface of said housing means an annular gap through which all of the pressure fluid flowing from said inlet to said outlet passes.

4. A control valve as defined in claim 1, wherein said control slide has a bottom wall, said second throttle passage extending axially through said bottom wall of said control slide and being laterally spaced from the axis thereof.

5. A control valve as defined in claim 4, wherein said means cooperating are connected to said bottom wall means for forming said annular gap and comprises a disk connected at the central region thereof to said bottom wall of the control slide while being spaced at an outer annular region from an outer end face of said bottom wall and having an outer diameter smaller than that of the latter, and including an annular washer between said disk and said shoulder at said inlet against which annular washer said disk is adapted to abut under the influence of said first spring means in a non-sealing manner.

6. A control valve as defined in claim 4, wherein said closer member is provided with a larger diameter blind bore extending from the other end thereof into said closer member and communicating with a small diameter bore extending from the inner end of said blind bore to the one end of the closer member, and at least one crossbore providing communication between the interior of said housing means and said large diameter bore, wherein said closer member has at the other end an outwardly extending rim forming with the inner surface of said housing means an annular gap through which all of the pressure fluid flowing from said inlet to said outlet passes, and including a piston on said element projecting into said large diameter bore, a spring biassed pin engaging with one end said piston and extending with clearance through said small diameter bore and having at the other end an enlarged portion normally closing said small diameter bore at the outer ends thereof, whereby upon raising of the temperature of the fluid passing through the control valve and concomitant expansion of said element said piston will move said enlarged portion of said pin out of said small diameter bore so that a bypass is formed through which fluid may flow from said inlet to said annular gap formed between said rim and said inner surface of said housing means.

7. A control valve as defined in claim 5, wherein said housing means comprises an outer tubular member having opposite open ends, an annular member forming said inlet abutting against one of said ends and having a portion extending into said tubular member and one in said shoulder, a hollow screw forming said outlet and being screwed into the other end of said outer member, a control bushing forming said control portion having an outer diameter smaller than the inner diameter of said outer tubular member so as to define a part of an annular space between said control bushings and said outer tubular member said control bushing abutting with one end against said annular washer abutting against said shoulder, said control bushing guiding said control slide and being formed with a crossbar communicating with said annular groove which is formed at the inner surface of said control bushing, a spacer sleeve abutting with one end against an inner end face of said hollow screw and engaging with a portion thereof the inner surface of the tubular outer member, said spacer sleeve having an end portion directed towards said control bushing having the same outer diameter as the latter and being formed in said end portion with a cross-bore, and a member forming said valve seat having a radially outwardly projection portion of the same diameter as said control bushing and being clamped between the outer ends of the control bushing and said spacer sleeve upon screwing said hollow screw inwardly.

8. A control valve as defined in claim 7, wherein said throttle passage provides the direct connection from said pressure fluid inlet to said pressure fluid outlet via said annular space.

* * * * *